Oct. 5, 1965
J. A. GROVES
3,210,537
PORTABLE LANTERN
Filed May 21, 1963
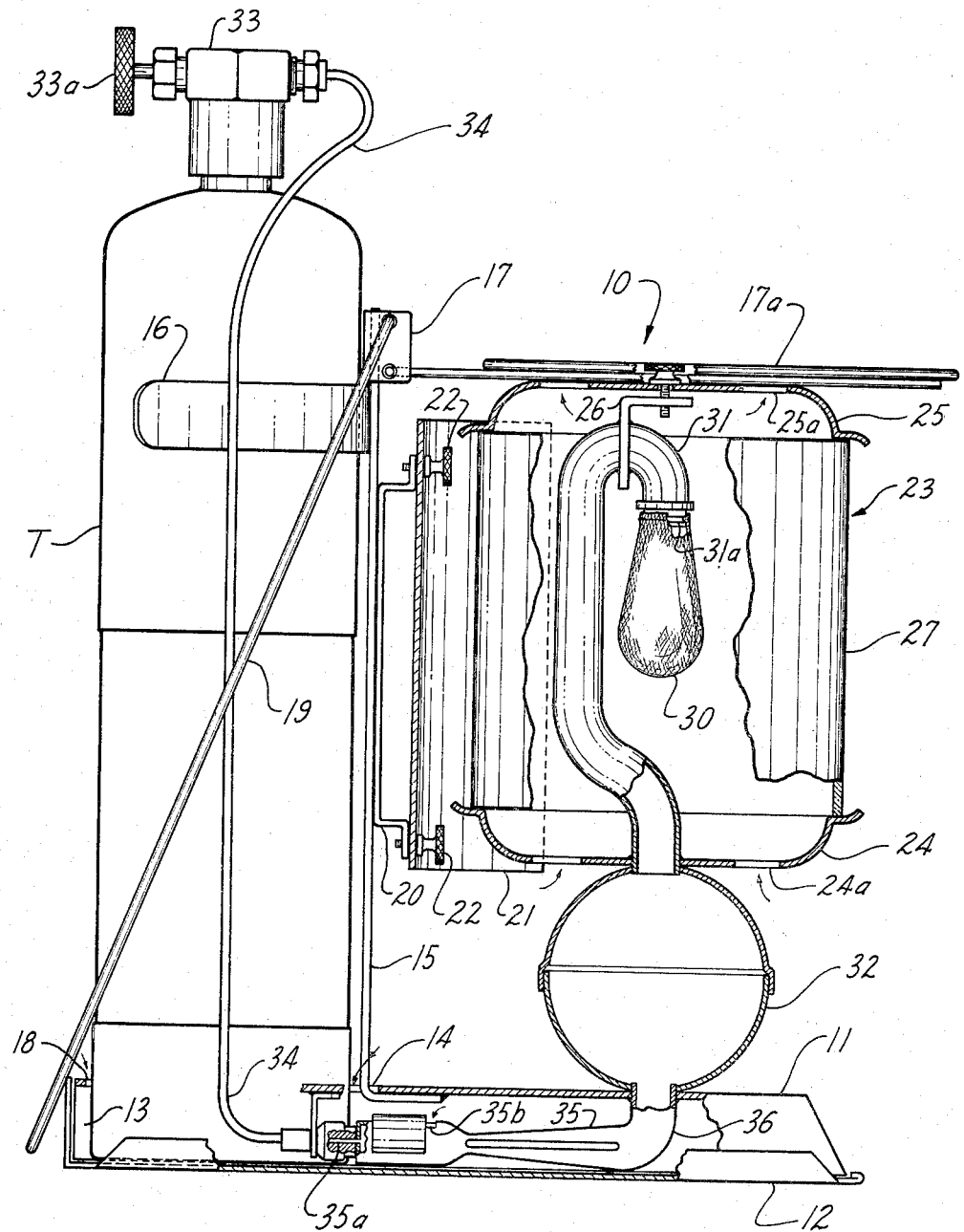
INVENTOR.
JOHN A. GROVES
BY
Green, McCallister &
Miller
HIS ATTORNEYS

3,210,537
PORTABLE LANTERN
John A. Groves, Rochester, Pa., assignor to Adams Brothers Mfg. Co., Pittsburgh, Pa., a corporation of Pennsylvania
Filed May 21, 1963, Ser. No. 281,892
4 Claims. (Cl. 240—38)

This invention relates to a portable combustion lantern that employs simple and inexpensive structural components and produces a steady light that is substantially brighter than that of similar competing lanterns. This invention also relates to a portable combustion lantern that is useful as an efficient source of cooking heat as well as light.

Combustion lanterns have been known in various forms for over half a century and portable gas lamps employing bottled gas, such as propane, have been known and commercially available for over ten years. However, due to operational inconvenience and lack of sufficient constant brightness, the market for combustion lamps has been limited to some extent. Conventional propane lamps produce substantially less light than lanterns that burn white gasoline, however, gasoline lanterns produce a varying or pulsating light that is objectionable to most outdoorsmen. Furthermore, gasoline lanterns are both dangerous and inconvenient due to the nature of liquid gasoline as a fuel.

Combustion lamps have the inherent capability of providing useful heat as well as light, if properly constructed. This invention makes full use of this inherent capability, takes advantage of the convenience of propane and significantly increases the critical brightness performance characteristics over those of existing propane lanterns. Thus it is little wonder that this lantern has been successfully introduced into a well developed and established field and has been widely accepted by campers, hunters and other outdoorsmen within a short period of time.

An object of my invention has thus been to investigate the factors that determine the operational, economical and commercial aspects of portable combustion lanterns;

Another object of my invention has been to provide a portable propane combustion lantern having highly improved brightness, brightness constancy and fuel consumption efficiency;

Another important object of my invention has been to provide combustion equipment that is serviceable both as an efficient cooking burner and as a high constant brightness lantern;

A further object of my invention has been to provide a portable combustion lantern that is virtually insensitive to wind and localized pressure changes;

A further important object of my invention has been to provide a combustion lantern having an improved smooth burning characteristic such that extremely low flame levels can be maintained even under adverse wind conditions; and These and other objects of my invention will appear to those skilled in the art upon reading and understanding the following disclosure of the inventive concepts upon which my invention is based, a description of an illustrative embodiment thereof, and the appended claims.

One phase of my invention relates to the use of a spherical flow optimizing chamber that permits large stable fuel-air mixture flows which are necessary to the production of bright steady light. While I have not been able to determine as a certainty exactly how the spherical chamber operates, comparative tests under controlled conditions have shown the spherical chamber to produce repeatedly superior results in brightness, constancy, and fuel consumption efficiency. I have determined that a substantially spherical chamber having a volume that is roughly two to three times the volume of the remaining fuel air conduits, will eliminate pressure fluctuations, promote mixing, correct harmonic interference or do whatever else is necessary to efficiently handle high combustible mixture flow rates to produce superior results.

Furthermore, the flow optimizing chamber, being of comparatively simple construction, does not add disproportionately to the overall cost of my device and therefore my lantern has proven itself to be, as a whole, a definite improvement over the existing state of the art.

Another phase of my invention relates to the use of a smoothly contoured ejector pump or venturi in combination with the enlarged spherical flow optimizing chamber. Venturi ejector pumps have been known generally for sometime as an efficient means for pumping one fluid by the momentum of another. However, existing propane lanterns have not been able to make use of the high efficiency of a venturi pump and have had to be satisfied with less efficient carburation mechanisms. I have found that my spherical flow optimizing chamber makes my lantern fully capable of handling the high efficient combustible mixture flows provided by a smoothly contoured venturi pump. Indeed, as presently understood, the solitary use of either a venturi pump or a spherical enlargement in a conventional lantern, would not produce the demonstrated superior results which I have achieved by placing these components in combination.

These phases of my invention are exemplified and more fully explained in the following description of a preferred specific embodiment of my invention wherein reference is made to the accompanying drawing, of which:

The figure is an elevational view partly in cross-section of a combustion lamp constructed in accordance with my invention.

More specifically, in the drawing there is shown a portable gas light or combustion lantern 10 having a downwardly concave sheet metal stand, carrying base or support means 11. A bottom closure wall 12 is removably attached to the base 11 to form therewith an enclosed air supply plenum or hollow chamber part 13. Supply combustion air enters the plenum chamber part 13 through an air inlet slot or opening 14 in the base 11. A vertically-extending heat shield and frame part, or support plate 15 is securely mounted on the base 11 adjacent the air inlet opening 14. The support plate 15 carries adjacent its upper end, a fuel tank holder or clamping flange 16 and a handle bracket 17. A substantially circular fuel tank receiving open portion 18 is formed in a rearward portion of the base 11 adjacent the plate 15 and intersects the opening 14. A commercially available fuel tank containing a liquid fuel that provides a source of gaseous fuel under pressure, such as a propane cylinder T, sits within the opening 18 of the base 11, extends vertically upwardly adjacent the support plate 15, and is supportingly connected thereto by the clamping flange 16.

A handle, hanger or alternate lantern support means 19 is pivotally secured to the handle bracket 17 to permit the lantern to be hung or carried as desired. A reflector support bracket 20 is welded or otherwise securely connected to the support plate 15 and removably carries a cylindrical reflector 21 by a pair of thumb screws 22. The cylindrical reflector 21 is highly polished on both surfaces, so that it can serve to concentrate light when in the position shown in the drawings where it presents a concave surface to the light source, or it can serve to diffuse light when mounted in a reversed position, so as to present a convex surface to the light source.

A rack or utensil support 17a is removably secured to the handle bracket 17, and extends outwardly over the heat producing region of the lamp. The rack 17a thus permits light cooking to be done while the lantern is being used for lighting purposes.

A vertically extending light enclosure, envelope or globe 23 is supported on the forward or right hand portion of the base 11 and comprises a pair of opposed lens holding flanges or lower and upper walls 24 and 25 respectively. The flanges 24 and 25 each include a plurality of open portions or air passages 24a and 25a respectively for permitting a convective flow of air through the globe 23 to transmit heat upwardly from the lantern to the cooking rack 17a. The upper wall 25 is removably supported in its upper position by a bracket 26 that is mounted on a tube 31 within the globe 23. An enclosing cylindrical lens 27 is lightly clamped between the opposed flanges 24 and 25 and completes the light enclosure 23. The lens 27 may be constructed of any shock and heat resistant glass or other transparent material.

Light is formed within the light enclosure 23 by combustion heating a heat responsive light emitting means such as a conventional gas mantle 30. The mantle 30 extends downwardly from a mantle hanger or flange 31a located at the burner end of a combustion gas mixture supply pipe or tube 31. To avoid mantle destroying back flow or flash back when the lantern is turned off, a 20 mesh Inconel wire screen is inserted in the tube 31 adjacent the mantle hanger 31a. The tube 31 turns upwardly and around to pass downwardly alongside the mantle 30 so that the combustible mixture is preheated before entering the combustion zone. A spherical flow optimizing, enlarged chamber part 32 is securely mounted, as by welding or brazing onto the base 11. At its upper end, the chamber part 32 is connected to support the combustion mixture supply tube 31 and the lower lens holding flange 24. The spherical chamber part 32 thus forms the structural support for the light enclosure 23 as well as an integral part of the combustible mixture supply means.

Returning now to the propane tank T, there is shown a control fitting or valve 33 having a knob or handle 33a that permits a manually selected flow of pressurized propane into a capillary tube 34 which delivers the fuel to a nozzle or orifice 35a positioned at the upstream end of a smoothly contoured convergent-divergent ejector or venturi pump 35 contained with the plenum chamber 13 of the base 11. The propane entering the venturi 35 is accelerated to a high velocity through an orifice 35a by a pressure of up to 30 p.s.i.g. depending upon the selected fuel flow. This accelerated flow of fuel, efficiently draws air in through an adjustable opening 35b of the venturi 35 to provide a high flow of partly mixed fuel and air. By mounting the venturi 35 within the plenum chamber 13 and in an offset relation to the opening 14, a relatively quiescent supply of air is insured, even in a high wind.

It will be noted that a lower conduit that extends along the hollow air chamber part provided by the wall 12 contains the nozzle 35a and the ejector 35, and is only open to the air chamber at the air inlet 35b and indirectly to the atmosphere from the air chamber and its inlet 14.

The venturi 35 is connected at its downstream end through a right-angle turn 36 to the lower end of the chamber 32 to supply the fuel-air mixture thereinto. The high flow of mixture delivered from the venturi 35, moves upwardly at a relatively high velocity into the chamber 32 where disturbances observable in conventional gas lamps such as pressure and mixture fluctuations are eliminated.

I have found that a spherical chamber of any substantial size will function satisfactorily to handle the large mixture flows induced by the efficient venturi pump 35. For optimum performance, I prefer to use a spherical chamber 32 having a volume that is roughly two to three times the volume of the remaining mixture containing conduits within the system, so that any given particle of fuel and air, will on an average, spend well over half of its flow-through-time within the chamber 32. While I cannot be certain as to the exact phenomena which causes the chamber 32 to greatly enhance the operation of my lamp, comparative tests have shown my lamp to have substantially greater brightness and brightness constancy than conventional propane lanterns. Furthermore, when my lantern is operated at the same brightness as conventional lanterns, it consumes up to 14% less fuel.

Those skilled in the art will thus realize that I have discovered and developed a simple, but new concept in gas combustion lighting by which the available brilliance has been unexpectedly increased and at the same time the pulsing or periodic variation in brilliance has been reduced to the point of imperceptability. Furthermore, I have embodied my concept in a lantern that may be used for light cooking.

While a preferred embodiment of my invention has been shown herein for purposes of illustration, it is understood that various changes may be made in this construction by those skilled in the art without departing from the spirit and disclosed concepts of the invention as particularly pointed out and defined in the appended claims.

Having thus described my inventive concepts and an illustrative embodiment thereof, I claim:

1. A portable gas lantern for use in combination with a source of gaseous fuel under pressure which comprises: a generally horizontally extending hollow base that forms a plenum chamber, one wall of said hollow base having an open portion therein for receiving a portable fuel tank, said one wall also having an air inlet opening therein for providing air communication between the atmosphere and the plenum chamber, a vertically extending plate for supporting the portable fuel tank, said plate being securely connected to said base adjacent said air inlet opening for shielding said air inlet opening from external breezes, a light enclosure supportably connected to said base and extending upwardly along said vertically extending plate to be in an opposed relationship with respect to the portable fuel tank whereby said vertical plate member will operate as a heat shield between said light enclosure and said fuel tank, and conduit means for supplying a combustible mixture of gaseous fuel and air to within said light enclosure, said conduit means comprising: a smoothly contoured convergent-divergent ejector pump positioned within said plenum chamber for receiving accelerated gaseous fuel from said source to efficiently induce a flow of air into said conduit means and into contact with the accelerated fuel, an enlarged spherical chamber connected to receive combustible mixture from said pump and constructed and arranged to eliminate any mixture or pressure fluctuations that may otherwise exist in the combustible mixture, and a supply tube connected to receive combustible mixture from said chamber and deliver it to within said light enclosure.

2. A portable gas lantern as defined in claim 1 wherein said supply tube comprises a mixture pre-heating tube that extends upwardly within said light enclosure and terminates within said light enclosure in a mantle hanger.

3. A portable gas lantern as defined in claim 1 wherein said spherical chamber has a volume that is two to three times the volume of the remaining mixture containing conduits.

4. A portable gas lantern for use in combination with a source of gaseous fuel under pressure in the form of a portable fuel tank which comprises, a carrying base having a carrying means at one end thereof for supporting the tank in an upright position thereon, said base having a hollow chamber part extending longitudinally therealong from said tank supporting means, a light enclosure, an enclosed internally-unobstructed flow-optimizing enlarged chamber part secured between a bottom portion of said light enclosure and a top portion of said hollow chamber part to position said light enclosure on said carrying base, said enlarged chamber part having a bottom inlet end portion and a top outlet end portion, a lower conduit extending along said hollow chamber part and having nozzle means at its downstream end for receiving gaseous fuel from the source and accelerating its flow upstream along said lower conduit, said lower conduit being connected at its upstream end to the bottom inlet end portion of said enlarged chamber part, a convergent-divergent ejector pump in said lower conduit between said nozzle means and the bottom inlet portion of said enlarged chamber part, an upper conduit connected at its downstream end to the top outlet end portion of said enlarged chamber part and extending upwardly within said light enclosure, a first air inlet into said hollow chamber part, and a second air inlet from said hollow chamber part into said lower conduit downstream thereof between said nozzle and said ejector pump and upstream of said first air inlet, whereby air will be drawn by said ejector pump from said hollow chamber part into the gaseous fuel moving along and within said lower conduit and mixed with the gaseous fuel before it is introduced into said enlarged chamber part.

References Cited by the Examiner

UNITED STATES PATENTS

| | | | |
|---|---|---|---|
| 1,174,650 | 3/16 | Armor | 158—118 |
| 1,407,346 | 2/22 | Cain. | |
| 2,482,543 | 9/49 | Jackson et al. | 240—52.3 X |
| 2,564,371 | 8/51 | Parsberg | 67—96 |
| 2,796,753 | 6/57 | Wallgren | 67—88 |
| 2,841,694 | 7/58 | Webster | 126—44 |
| 2,985,751 | 5/61 | Henson | 126—44 X |

JAMES W. WESTHAVER, *Primary Examiner.*

FREDERICK KETTERER, *Examiner.*